(12) United States Patent
Yang et al.

(10) Patent No.: US 12,197,257 B2
(45) Date of Patent: Jan. 14, 2025

(54) ROTATION SHAFT ASSEMBLY AND ELECTRONIC DEVICE

(71) Applicant: Lenovo (Beijing) Limited, Beijing (CN)

(72) Inventors: Feng Yang, Beijing (CN); Detao You, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 147 days.

(21) Appl. No.: 17/679,945

(22) Filed: Feb. 24, 2022

(65) Prior Publication Data

US 2023/0105988 A1   Apr. 6, 2023

(30) Foreign Application Priority Data

Sep. 22, 2021   (CN) .......................... 202111108124.8

(51) Int. Cl.
G06F 1/16    (2006.01)
F16C 11/10   (2006.01)

(52) U.S. Cl.
CPC ............ G06F 1/1681 (2013.01); F16C 11/10 (2013.01)

(58) Field of Classification Search
CPC ...... G06F 1/1681; G06F 1/1615; F16C 11/10; H04M 1/022
See application file for complete search history.

(56) References Cited

U.S. PATENT DOCUMENTS

| | | | | |
|---|---|---|---|---|
| 10,809,772 B1* | 10/2020 | Wang | ..................... | G06F 1/1681 |
| 2015/0184439 A1* | 7/2015 | Hsu | ........................... | G06F 1/16 |
| | | | | 16/350 |

FOREIGN PATENT DOCUMENTS

TW          M614906 U   *  7/2021   ............... H05K 7/14

* cited by examiner

*Primary Examiner* — Abhishek M Rathod
*Assistant Examiner* — Keon Nmn Kim
(74) *Attorney, Agent, or Firm* — ANOVA LAW GROUP, PLLC

(57) ABSTRACT

A rotation shaft assembly includes first and second rotation shafts configured to be connected to first and second bodies, respectively, a synchronization mechanism disposed between and transmissively connected to the first and second rotation shafts, and a control mechanism including first and second followers sleeved at the first and second rotation shaft, respectively, and a lock member disposed between the first and second rotation shafts. In a first state of the first and second bodies flipping relative to each other, the lock member interacts with the first or second follower to fix the first or second rotation shaft. In a second state of the first and second bodies flipping relative to each other, action of the lock member on the first and second followers is released, and the first and second rotation shafts rotate synchronously through the synchronization mechanism.

16 Claims, 7 Drawing Sheets

ROTATION SHAFT ASSEMBLY AND ELECTRONIC DEVICE

CROSS-REFERENCE TO RELATED APPLICATION

This application claims priority to Chinese Patent Application No. 202111108124.8, filed on Sep. 22, 2021, the content of which is incorporated herein by reference in its entirety.

TECHNICAL FIELD

The present disclosure generally relates to the field of computer hardware and, more particularly, to a rotation shaft assembly and an electronic device.

BACKGROUND

In existing technologies, a notebook computer adopts a dual-axis synchronous rotation shaft structure, as shown in part (a) of FIG. 6 and FIG. 8. When a display end and a system end are flipped relative to each other, a screen of the display end will rise, making a user's visual frame wider (reducing the user's visual screen-to-body ratio). This is not suitable for the desire of a high screen-to-body ratio and results in poor user experience. At the same time, to prevent the rotation shaft from hitting the desktop and causing damage to the electronic device while being lowered when the display end is flipped to an angle for normal use by the user, it is needed to add a rubber pad on the rotation shaft. An overall volume of the rotation shaft will increase, as well as manufacturing costs. Overall appearance of the notebook computer is also poor because of the additional components.

SUMMARY

In accordance with the disclosure, there is provided a rotation shaft assembly including first and second rotation shafts configured to be connected to first and second bodies, respectively, a synchronization mechanism disposed between and transmissively connected to the first and second rotation shafts, and a control mechanism including first and second followers sleeved at the first and second rotation shaft, respectively, and a lock member disposed between the first and second rotation shafts. In a first state of the first and second bodies flipping relative to each other, the lock member interacts with the first or second follower to fix the first or second rotation shaft. In a second state of the first and second bodies flipping relative to each other, action of the lock member on the first and second followers is released, and the first and second rotation shafts rotate synchronously through the synchronization mechanism.

Also in accordance with the disclosure, there is provided an electronic device including a first body, a second body, and a rotation shaft assembly including first and second rotation shafts connected to first and second bodies, respectively, a synchronization mechanism disposed between and transmissively connected to the first and second rotation shafts, and a control mechanism including first and second followers sleeved at the first and second rotation shaft, respectively, and a lock member disposed between the first and second rotation shafts. In a first state of the first and second bodies flipping relative to each other, the lock member interacts with the first or second follower to fix the first or second rotation shaft. In a second state of the first and second bodies flipping relative to each other, action of the lock member on the first and second followers is released, and the first and second rotation shafts rotate synchronously through the synchronization mechanism.

BRIEF DESCRIPTION OF THE DRAWINGS

The following drawings are merely examples for illustrative purposes according to various disclosed embodiments and are not intended to limit the scope of the present disclosure.

REFERENCE NUMERALS

Figure 1:
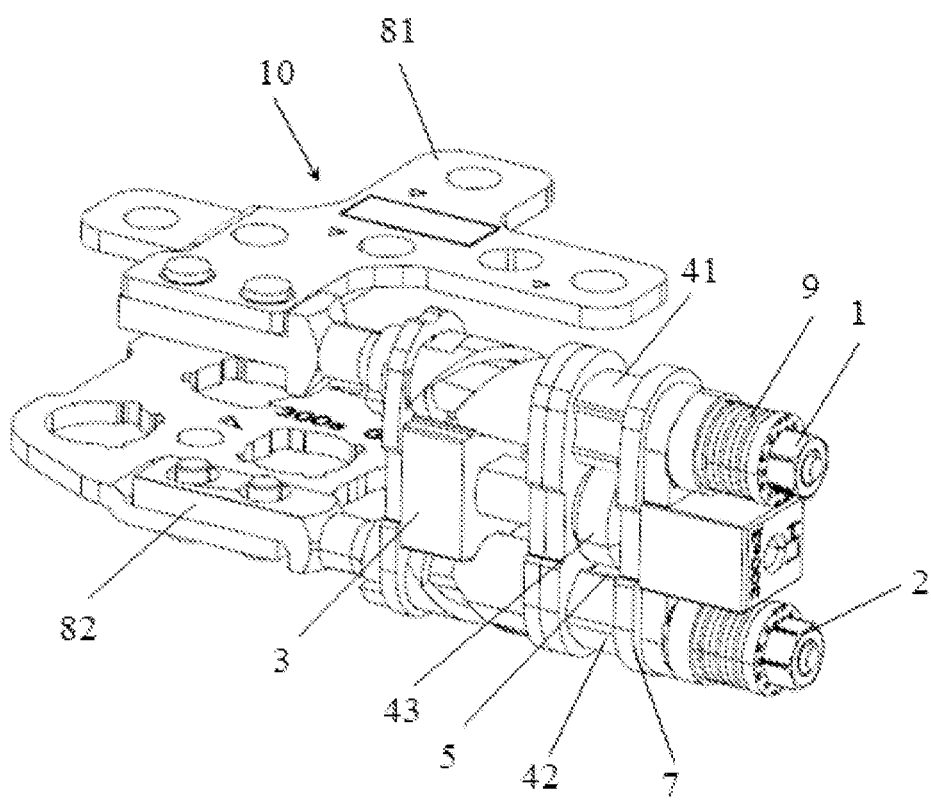
FIG. 1 is a schematic structural diagram of an example rotation shaft assembly consistent with the present disclosure.

10—Rotation shaft assembly, 20—First body, 30—Second body,
1—First rotation shaft, 11—First helical groove, 12—First annular groove,
2—Second rotation shaft, 21—Second helical groove, 22—Second annular groove,
3—Synchronization mechanism, 41—First follower, 411—First protrusion,
412—First groove, 413—First arc segment, 42—Second follower,
421—Second protrusion, 422—Second groove, 423—Second arc segment, 43—Lock member
5—Gap, 61—First shaft sleeve, 62—Second shaft sleeve, 7—Connection member
81—First fixation frame 82—Second fixation frame 9—Torsion mechanism

DETAILED DESCRIPTION OF THE EMBODIMENTS

Hereinafter, embodiments and features consistent with the disclosure will be described with reference to drawings.

Various modifications may be made to the embodiments of the present disclosure. Thus, the described embodiments should not be regarded as limiting, but are merely examples. Those skilled in the art will envision other modifications within the scope and spirit of the present disclosure.

The accompanying drawings, which are incorporated in and constitute a part of this specification, illustrate embodiments of the present disclosure and, together with the general description of the disclosure above and the detailed description of the embodiments below, serve to explain the principle of the present disclosure.

These and other features of the present disclosure will become apparent from the following description of non-limiting embodiments with reference to the accompanying drawings.

Although the present disclosure is described with reference to some specific examples, those skilled in the art will be able to realize many other equivalents of the present disclosure.

The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to be limiting, but merely serve as a basis for the claims and a representative basis for teaching one skilled in the art to variously employ the present disclosure in substantially any suitable detailed structure.

The present disclosure provides a rotation shaft assembly. FIG. 1 to FIG. 4 are schematic structural diagrams showing a rotation shaft assembly 10 consistent with the disclosure, and FIG. 5 is a schematic diagram showing operation of the rotation shaft assembly 10 consistent with the disclosure. As shown in FIG. 1 to FIG. 5, the rotation shaft assembly 10 is used to connect a first body 20 to a second body 30, and includes a first rotation shaft 1, a second rotation shaft 2, a synchronization mechanism 3, and a control mechanism.

The first rotation shaft 1 is connected to a first body 20.

The second rotation shaft 2 is connected to a second body 30.

The synchronization mechanism 3 is arranged between the first rotation shaft 1 and the second rotation shaft 2, and is transmissively connected to the first rotation shaft 1 and the second rotation shaft 2.

The control mechanism includes a first follower 41 sleeved at the first rotation shaft 1, a second follower 42 sleeved at the second rotation shaft 2, and a lock member 43 between the first rotation shaft 1 and the second rotation shaft 2. When the first body 1 and the second body 2 are in a first state of the first body 1 and the second body 2 flipping relative to each other, the lock member 43 can interact with the first follower 41 to fix the first rotation shaft 1 or interact with the second follower 42 to fix the second rotation shaft 2. When the first body 1 and the second body 2 are in a second state of the first body 1 and the second body 2 flipping relative to each other, the action of the lock member 43 on both the first follower 41 and the second follower 42 is released, and the first rotation shaft 1 and the second rotation shaft 2 rotate synchronously through the synchronization mechanism 3.

The first body 20 may be a display end of a notebook computer, and the second body 30 may be a system end of the notebook computer.

In the present disclosure, the rotation shaft assembly 10 may include the first rotation shaft 1 and the second rotation shaft 2 respectively connected to the first body 20 and the second body 30. The first rotation shaft 1 and the second rotation shaft 2 may be connected through the synchronization mechanism 3. Further, the control mechanism may be disposed between the first rotation shaft 1 and the second rotation shaft 2. During a process of the first body 20 and the second body 30 flipping relative to each other, the followers and the lock member 43 of the control mechanism may cooperate to realize the independent rotation of the first rotation shaft 1 or the second rotation shaft 2, and also to realize the synchronous rotation of the first rotation shaft 1 and the second rotation shaft 2. As such, during the process of the first body 20 and the second body 30 flipping relative to each other, the screen (the first body 20) may be lowered to meet the user's demand for a high screen-to-body ratio. Further, the first body 20 may not be brought into contact with a placement plane such as a desktop. Correspondingly, there may be no need to add additional rubber pads. The manufacturing cost of electronic equipment may be reduced effectively, and the product appearance may be simple and beautiful.

In some embodiments, as shown in FIGS. 1 to 4, the first follower 41 is provided with a first protrusion 411 and a first groove 412 that cooperate with the lock member 43, and the second follower 42 is provided with a second protrusion 421 and a second groove 422 that cooperate with the lock member 43. When the first body 20 and the second body 30 are in the first state of the first body 20 and the second body 30 flipping relative to each other, the first protrusion 411 or the second protrusion 421 abuts against the lock member 43, to fix the first rotation shaft 1 or the second rotation shaft 2 and then allow the second rotation shaft 2 or the first rotation shaft 1 rotate independently. When the first body 20 and the second body 30 are in the second state of flipping relative to each other, the first groove 412 and the second groove 422 may face the lock member 43 and there may have a gap 5 between each of the first groove 412 and the second groove 422 and the lock member 43. Correspondingly, the action of the lock member 43 on the first follower 41 and that on the second follower 42 may be both released.

Specifically, the first follower 41 and the second follower 42 may be respectively sleeved at the first rotation shaft 1 and the second rotation shaft 2. When the first body 20 and the third body 30 are flipped relative to each other to drive the first rotation shaft 1 or the second rotation shaft 2 to rotate, the first follower 41 sleeved at the first rotation shaft 1 or the second follower 42 sleeved at the second rotation shaft 2 may be driven to rotate synchronously. When the first follower 41 rotates to a certain extent that the first protrusion 411 abuts against the lock member 43, the first rotation shaft 1 may be fixed and the first rotation shaft 1 may be not able to continue to rotate at this time. When the first follower 41 rotates to a certain extent that the first groove 412 faces the lock member 43, since there is the gap 5 between the first groove 412 and the lock member 43, the interaction between the first rotation shaft 1 and the lock member 43 may be released, that is, the lock member 43 may not be able to fix the first rotation shaft 1. At this time, if the second rotation shaft 2 is rotating and the second groove 412 of the second rotation shaft 2 faces the lock member 43, the second rotation shaft 2 may rotate to drive the first rotation shaft 1 to rotate synchronously with the second shaft 2 through the synchronization mechanism 3. The cooperation of the second protrusion 421 and the second groove 422 of the second follower 42 with the lock member 43 is similar to that of the first follower 41 described above, and details are not described herein again.

Figure 4:
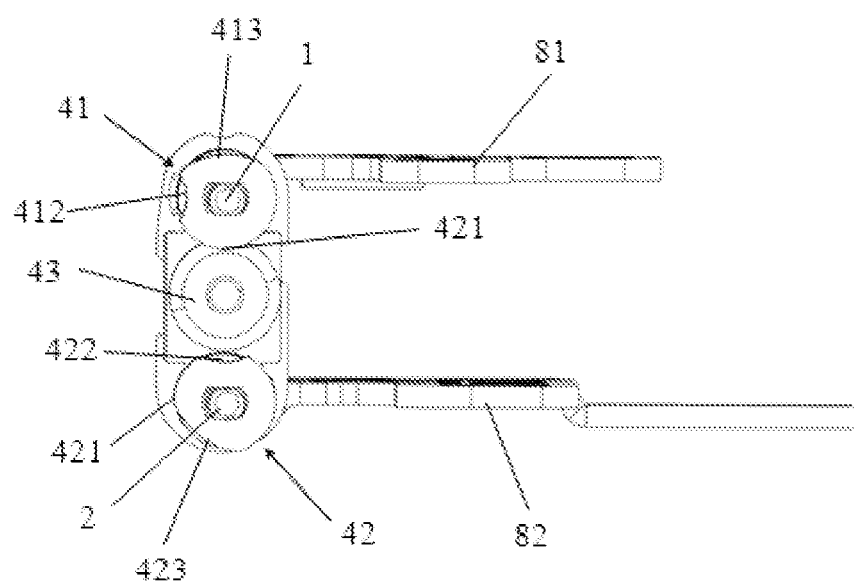
FIG. 4 is a side view of the control mechanism in FIG. 3.
Figure 5:
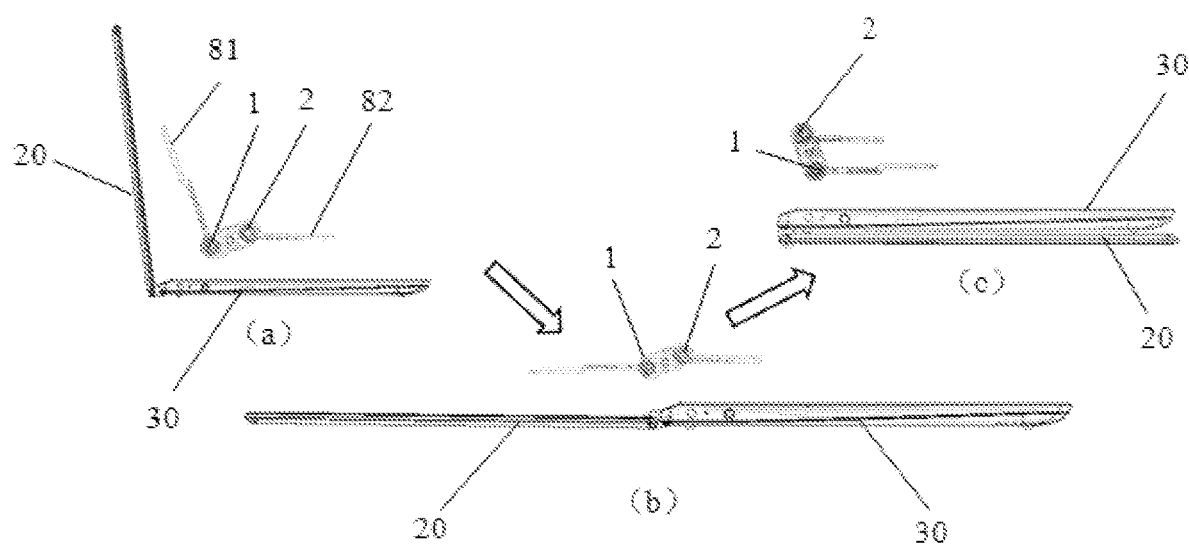
FIG. 5 is a schematic diagram showing operation of an example rotation shaft assembly consistent with the present disclosure.

In one embodiment, as shown in FIG. 4, the first follower 41 further includes a first arc segment 413. The first arc segment 413 is disposed between the first protrusion 411 and the first groove 412. When the first follower 41 rotates with the first rotation shaft 1, the first arc segment 413 may interact with the lock member 43, to push the lock member 43 to move toward the first rotation shaft 1, and the first protrusion 411 may abut against the lock member 43 to fix the first rotation shaft 1. Similarly, the second follower 42 further includes a second arc segment 423, and the second arc segment 423 is disposed between the second protrusion 421 and the second groove 422. When the second follower 42 rotates with the second shaft 2, the second arc segment 423 may interact with the lock member 43 to push the lock member 43 to move toward the second rotation shaft 2, and the second protrusion 412 may abut against the lock member 43 to fix the second rotation shaft 2.

Figure 2:
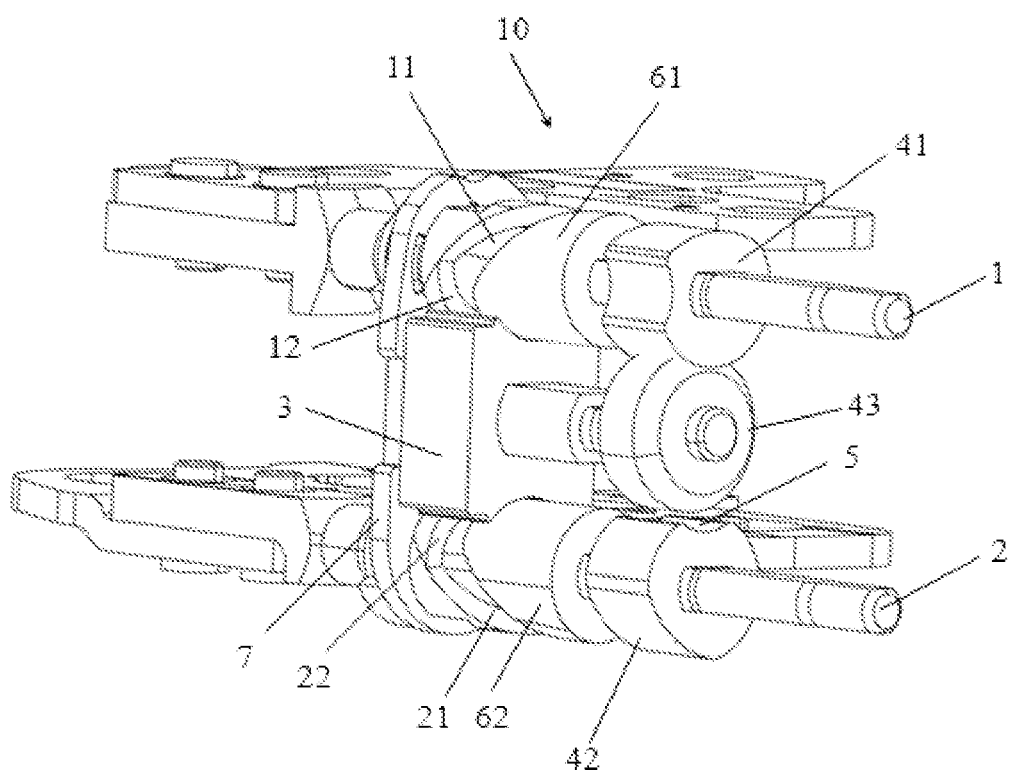
FIG. 2 is another schematic structural diagram of the example rotation shaft assembly (after part of the structure is removed) consistent with the present disclosure.

In one embodiment, as shown in FIG. 2, when the first rotation shaft 1 is fixed and the second groove 422 of the second rotation shaft 2 faces the lock member 43, the second rotation shaft 2 may be able to rotate independently. When the second rotation shaft 2 rotates, the second arc segment 423 may interact with the lock member 43 to push the lock member 43. Because of the arc shape of the second arc segment 423, a cam structure may be formed, such that the lock member 43 may re-act on the second follower 42 and the lock member 43 may move toward the second rotation shaft 2 by a first distance. Correspondingly, the fixing of the first rotation shaft 1 may be released.

Figure 3:
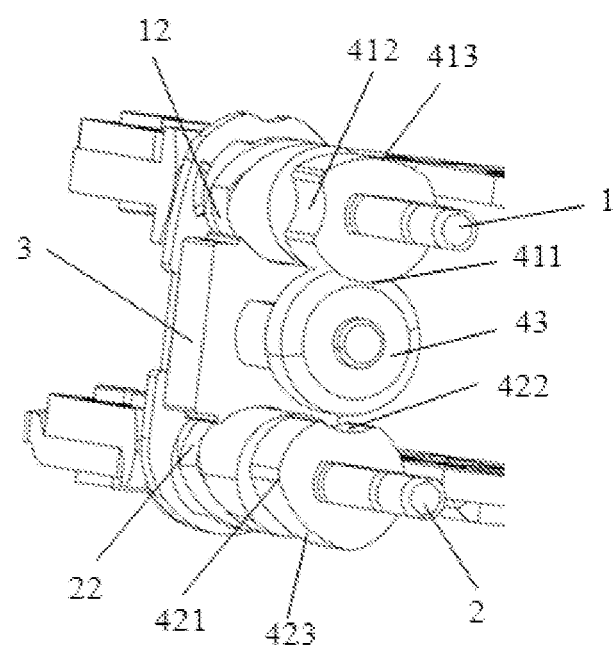
FIG. 3 is a schematic structural diagram of an example control mechanism of a rotation shaft assembly consistent with the present disclosure.

As shown in FIG. 3 and FIG. 4, both the first groove 412 and the second groove 422 are arc-shaped grooves, to ensure smooth rotation of the first rotation shaft 1 and the second rotation shaft 2 after the action of the lock member 43 is released.

In one embodiment, one first arc segment 413 and one second arc segment 423 may be provided at the first follower 41 and the second follower 42, respectively. In other embodiments, a plurality of first arc segments 413 and a plurality of second arc segments 423 may be provided, to enable the first rotation shaft 1 and the second rotation shaft 2 to rotate multiple times to realize the relative flipping of the first body 20 and the second body 30.

In one embodiment, as shown in FIG. 3 and FIG. 4, the first follower 41 and the second follower 42 are both special-shaped structures. Further, the first protrusion 411, the first groove 412, and the first arc segment 413 of the first follower 41, the second protrusion 421, the second groove 422, and the second arc segment 423 of the second follower 42 may be staggered relative to the lock member 43, to ensure the independent rotation and the synchronous rotation of the first rotation shaft 1 and the second rotation shaft 2. That is, the first protrusion 411 and the second protrusion 421 may be prevented from abutting against the lock member 43 at the same time that results in the first rotation shaft 1 and the second rotation shaft 2 not being able to rotate smoothly.

In one embodiment, an outer circumference of the lock member 43 may be a circular annular structure to interact with outer circumferences of the first follower 41 and the second follower 42. In some embodiments, the lock member 43 may be an elastic member, to ensure the pushing action of the first follower 41 and the second follower 42 on the lock member 43 and the reciprocating movement of the lock member 43 between the first rotation shaft 1 and the second rotation shaft 2.

In some embodiments, as shown in FIG. 2, a first helical groove 11 and a second helical groove 21 are respectively provided at transmission sections of the first rotation shaft 1 and the second rotation shaft 2 that cooperate with the synchronization mechanism 3. The first helical groove 11 and the second helical groove 21 may be disposed correspondingly and may have opposite helical directions. The synchronization mechanism 3 may have a first end and a second end. The first end may be embedded in the first helical groove 11 and the second end may be embedded in the second helical groove 21. Correspondingly, after the act of the first follower 41, the second follower 42, and the lock member 43 is released, the first end may move along the first helical groove 11 and the second end may move along the second helical groove 21, to realize the synchronous rotation of the first rotation shaft 1 and the second rotation shaft 2.

In one embodiment, as shown in FIG. 2, the transmission sections of the first rotation shaft 1 and the second rotation shaft 2 that cooperate with the synchronization mechanism 3 are further provided with a first annular groove 12 and a second annular groove 22 respectively. The first annular groove 12 may be connected to the first helical groove 11, and the second annular groove 22 may be connected to the second helical groove 21. One of the first rotation shaft 1 or the second rotation shaft 2 may be fixed and another may rotate. For example, when the first rotation shaft 1 rotates alone, the first end of the synchronization mechanism 3 may move along the first annular groove 12 of the first rotation shaft 1, or, when the second rotation shaft 2 rotates alone, the second end of the synchronization mechanism 3 may move along the second annular groove 22 of the second rotation shaft 2, to ensure the independent rotation of the first rotation shaft 1 or the second rotation shaft 2.

In some embodiments, as shown in FIGS. 1 and 2, the rotation shaft assembly 10 further includes a first shaft sleeve 61 sleeved at a first transmission section of the first rotation shaft 1 and a second shaft sleeve 62 sleeved at a second transmission section of the second rotation shaft 2. The first helical groove 11 and the first annular groove 12 may be opened on an outer circumference of the first shaft sleeve 61, and the second helical groove 21 and the second annular groove 22 may be opened on an outer circumference of the second shaft sleeve 62. By arranging one shaft sleeve on each rotation shaft and setting one helical groove and one annular groove on each shaft sleeve, it may be convenient to replace the helical groove and annular groove with a suitable size according to the actual rotation needs. Further, it may be convenient to process and manufacture, and may also protect the transmission sections of the rotation shafts to a certain extent. At the same time, the use of the shaft sleeve may also provide a certain torque for turning over.

In some embodiments, helical grooves and annular grooves can also be directly formed at shaft bodies of the first rotation shaft 1 and the second rotation shaft 2. In these embodiments, the entire rotation shaft needs to be replaced, that is, rotations shafts of different sizes are needed for electronic devices of different sizes.

In some embodiments, as shown in FIG. 2, a first control section (a shaft section corresponding to the lock member 43) of the first rotation shaft 1 that is sleeved with the first follower 41 and the first transmission section sleeved with the first shaft sleeve 61 are flat shaft sections. A second control section of the second rotation shaft 2 sleeved with the second follower 42 and the second transmission section sleeved with the second shaft sleeve 62 are flat shaft sections. Correspondingly, a reliable connection between the first follower 41 and the first rotation shaft 1, and a reliable connection between the second follower 42 and the second rotation shaft 2 may be ensured.

In some embodiments, as shown in FIGS. 1 to 3, the synchronization mechanism 3 and the lock member 43 are coaxially connected. The rotation shaft assembly 10 further includes at least one connection member 7 located at least between the synchronization mechanism 3 and the lock member 43, to separate the synchronization mechanism 3 and the lock member 43. In one embodiment, the first rotation shaft 1 and the second rotation shaft 2 may be arranged in parallel and connected by the at least one connection member 7.

In some embodiments, the rotation shaft assembly 10 further includes a first fixation frame 81 and a second fixation frame 82. One end of the first rotation shaft 1 may be connected to the first body 20 through the first fixation frame 81, and one end of the second rotation shaft 2 may be connected to the first body 20 through the second fixation frame 82. As shown in FIGS. 1 to 4, when the rotation shaft assembly 10 is in the initial state, the first fixation frame 81 and the second fixation frame 82 are parallel to each other, such that the first body 20 and the second body 30 are closed.

In this embodiment, the first fixed frame 81 may be disposed close to the first transmission section of the first rotation shaft 1 and the second transmission section of the second rotation shaft 2. The connection member 7 may be sleeved between the first fixation frame 81 and the first transmission section and the second transmission section.

In some embodiments, the rotation shaft assembly 10 further includes torsion mechanisms 9 disposed at the first rotation shaft 1 and the second rotation shaft 2 respectively. The torsion mechanisms 9 may be disposed at other ends (not installed with fixation frames) of the first rotation shaft 1 and the second rotation shaft 2 to provide torque for the rotation of the shaft assembly 10.

FIG. 5 is a schematic diagram showing operation of the rotation shaft assembly 10 consistent with the present disclosure. As shown in FIG. 5, in conjunction with FIGS. 1 to 4, when the rotation shaft assembly 10 is in an initial state, the first fixation frame 81 and the second fixation frame 82 are in a parallel arrangement, and the notebook computer is in a closed state. The first protrusion 411 of the first follower 41 sleeved at the first rotation shaft 1 abuts against and is in contact with the lock member 43, to fix the first rotation shaft 1. When the first body 20 is flipped, since the first rotation shaft 1 and the second rotation shaft 2 are connected together by the connection member 7, at this time, the second rotation shaft 2 rotates with the turning of the first body 20 relative to the second body 30. When the second rotation shaft 2 rotates, the action of the second arc segment 423 and the lock member 43 drives the lock member 43 to move toward the second rotation shaft 2. When the first body 20 is flipped over to the first angular position as shown in part (a) of FIG. 5, the lock member 43 moves toward the second rotation shaft by a first distance and then abuts against the second protrusion 421 of the second follower 42 to fix the second rotation shaft 2. At the same time, the fixing act of the first rotation shaft 1 on the lock member 43 is released. During the process of turning the first body 20 to the first angular position, since the first rotation shaft 1 is fixed, as shown in part (a) of FIG. 5, the first fixation frame 81 is perpendicular to a connection line between the shaft centers of the first rotation shaft 1 and the second rotation shaft 2, and a first angle is formed between the second fixation frame 82 and a connection line between the shaft centers of the first rotation shaft 1 and the second rotation shaft 2. Correspondingly, the first rotation shaft 1 connected to the first body 20 may be lowered, to improve the user's visual screen-to-body ratio and meet the user's needs. After the fixing effect of the first rotation shaft 1 on the lock member 43 is released, the first rotation shaft 1 is able to rotate along with turning of the first body 20. When the first rotation shaft 1 rotates, the act of the first arc segment 413 on the lock member 43 drives the lock member 43 to move toward the first rotation shaft 1. When the first body 20 is flipped over to the second angular position as shown in part (b) of FIG. 5, the lock member 43 moves toward the first rotation shaft 1 by a second distance (the second distance is smaller than the first distance), such that the fixing effect between the second rotation shaft 1 and the lock member 43 is released. Since the second distance is smaller than the first distance, the first protrusion 411 of the first follower 41 is not in contact with the lock member 43, and the fixing effect of the first rotation shaft 1 and the lock member 43 is still in the released state. As shown in part (b) of FIG. 5, the first fixation frame 81 forms a second included angle with the connection line between the shaft centers of the first rotation shaft 1 and the second rotation shaft 2, and the first angle between the second fixation frame 82 with the connection line between the shaft centers of the first rotation shaft 1 and the second rotation shaft 2 remains unchanged. When the fixing effect of the first rotation shaft 1 on the lock member 43 is released and the fixing effect of the second rotation shaft 2 on the lock member 43 is released, the first body 20 may be continuously flipped to drive the first rotation shaft 1 to rotate, to transmit the rotating force of the first rotation shaft 1 from the first end to the second end by the action of the first helical groove 11 provided at the first rotation shaft 1 and the first end of the synchronization mechanism 3. Further, through the action of the second end and the second helical groove 21 on the second rotation shaft 2, the second rotation shaft 2 is driven to rotate, to realize the synchronous rotation of the first rotation shaft 1 and the second rotation shaft 2 and make the first body 20 is able to be flipped relative to the second body 30 by 360° to the third angular position as shown in part (c) of FIG. 5. At this time, the first fixation frame 81 forms a third included angle with the connection line between the shaft centers of the first rotation shaft 1 and the second rotation shaft 2, the second fixation frame 82 forms a fourth included angle with the connection line between the shaft centers of the first rotation shaft 1 and the second rotation shaft 2. The process of turning over the first body 20 relative to the second body 30 in an inversed direction is opposite to the above process, and details are not described herein again.

The first angular position is the angular position that enables the user to use the electronic device normally and prevents the rotation shaft from touching the desktop. The first angular position may be set according to the actual needs of the user, for example, the first angular position may be 90-160°. In some embodiments, the second angular position may be 180°, and the third angular position may be 360°. As described above, the control mechanism may be able to drive the first rotation shaft 1 or the second rotation shaft 2 to rotate independently, or drive the first rotation shaft 1 and the second rotation shaft 2 to rotate synchronously in cooperation with the synchronization mechanism 3, to realize the turnover of the first body 20 and the second body 30 at any angle of 0-360°. The above-mentioned rotation shaft assembly may have a simple and reasonable structure, which may effectively increase the user's visual screen-to-body ratio and prevent the collision between the rotation shaft assembly and the desktop without providing additional rubber pads. The overall volume may be reduced, ensuring that the appearance of the electronic device is beautiful.

In above embodiments, the first rotation shaft 1 connected to the first body 20 may be fixed first, and the independent rotation of the second rotation shaft 2 may drive the first body 20 to flip by the first angle relative to the second body 30. Then the second shaft 2 may be fixed, such that the first shaft 1 may rotate alone. After the first body 20 flips relative to the second body 30 from the first angle to the second angle, the first shaft 1 and the second shaft 2 may synchronously rotate through the synchronization mechanism 3. As such, the entire process of the first body 20 flipping relative to the second body 30 can be realized.

In some other embodiments, the first rotation shaft 1 and the second rotation shaft 2 may be rotated synchronously just after the first rotation shaft 1 or the second rotation shaft 2 is rotated independently. Specifically, the first rotation shaft 1 being fixed in the initial state is used as an example for description. The structures of the first follower 41 and the second follower 42 may be designed such that when the second rotation shaft 2 rotates independently and interacts with the lock member, after the lock member 43 moves toward the second rotation shaft 2 by the first distance, the second protrusion 421 may not abut against the lock member 43, such that the fixing effect of the first rotation shaft 1 on the lock member 43 is released and the fixing effect of the second rotation shaft 2 on the lock member 43 is released.

Figure 6:
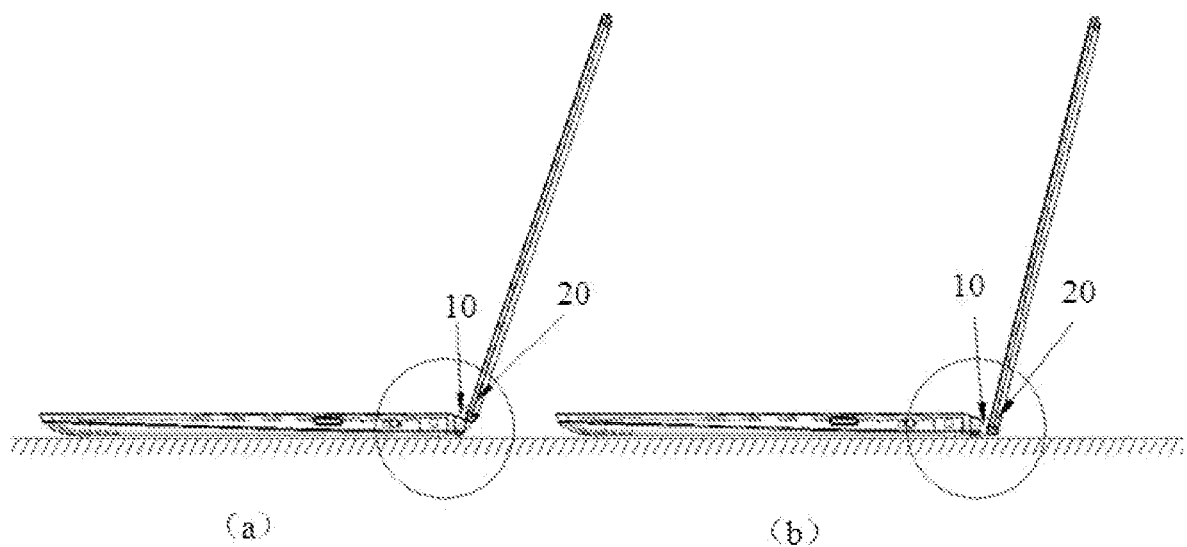
FIG. 6 shows a comparison between a rotation shaft assembly consistent with the present disclosure and a rotation shaft of existing technologies.
Figure 7:
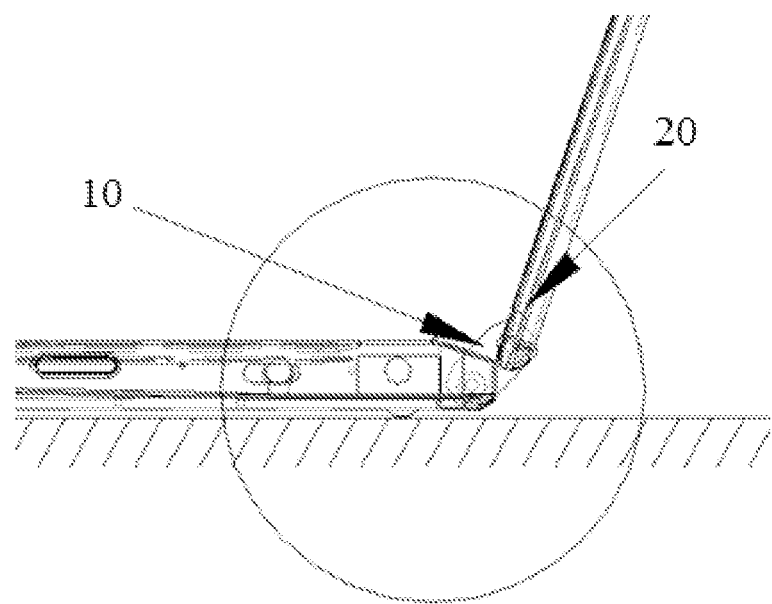
FIG. 7 is an enlarged view of circled portion in part (a) of FIG. 6.
Figure 8:
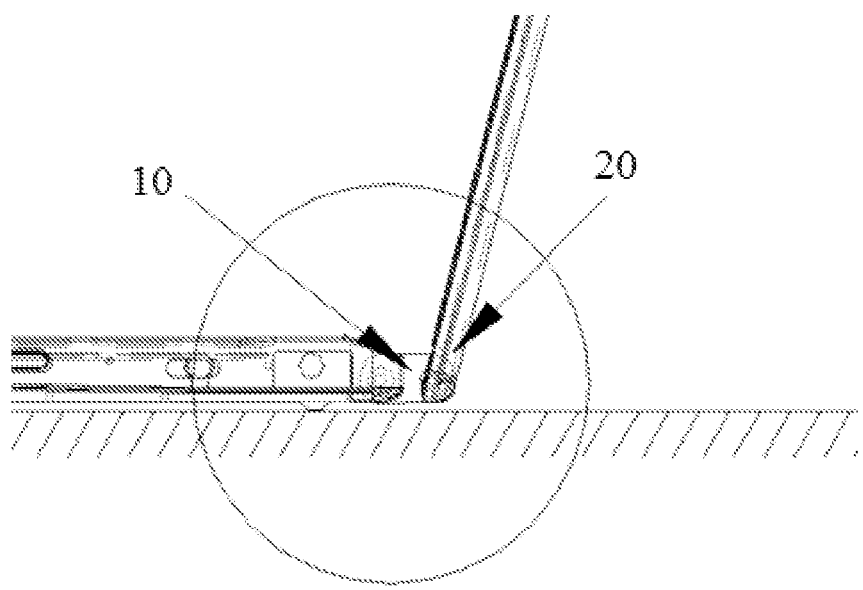
FIG. 8 is an enlarged view of circled portion in part (b) of FIG. 6.

FIGS. 6 to 8 are diagrams showing comparison between the rotation shaft assembly provided by the embodiments of the present disclosure and a rotation shaft assembly according to existing technologies. As shown in FIGS. 6 to 8, in the rotation shaft assembly 10 of the embodiments of the present disclosure, when the first body 20 and the second body 30 flip relative to each other, the screen (the first body 20) may be lowered, effectively increasing the user's visual screen-to-body ratio and preventing the contact between the first body 20 and the placement plane (such as the desktop) without providing additional rubber pads. The overall volume and the manufacturing cost may be reduced, and the product shape may be simple and beautiful.

As shown in FIG. 5, the present disclosure further provides an electronic device including any rotation shaft assembly 10 provided by various embodiments of the present disclosure. The electronic device further includes a first body 20 and a second body 30. The first body 20 and the second body 30 may be connected to each other and capable of flipping relative to each other through the rotation shaft assembly 10.

In one embodiment, the electronic device may be a notebook computer, the first body 20 may be a display end, and the second body 30 may be a system end. The display end may be connected to the first rotation shaft 1 through a first fixation frame 81, and the system end may be connected to the second rotation shaft 2 through a second fixation frame 82.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A rotation shaft assembly comprising:
   a first rotation shaft configured to be connected to a first body;
   a second rotation shaft configured to be connected to a second body;
   a synchronization mechanism, disposed between and connected to the first rotation shaft and the second rotation shaft; and
   a control mechanism, including a first follower sleeved at the first rotation shaft, a second follower sleeved at the second rotation shaft, and a lock member disposed between the first rotation shaft and the second rotation shaft, a first protrusion and a first groove that cooperate with the lock member being provided at the first follower, and a second protrusion and a second groove that cooperate with the lock member being provided at the second follower;
   wherein:
      in a first state of the first body and the second body, the first body and the second body are flipped with each other, the first protrusion abuts against the lock member, the lock member interacts with the first follower to fix the first rotation shaft, and the second rotation shaft is not fixed by the lock member;
      in a second state of the first body and the second body, the first body and the second body are flipped with each other, the first groove and the second groove face the lock member, with a first gap between the lock member and the first groove, and a second gap between the lock member and the second groove, and action of the lock member on the first follower and the second follower is released, and the first rotation shaft and the second rotation shaft rotate synchronously through the synchronization mechanism;
      the first follower is not in contact with the lock member when the first groove faces the lock member with the first gap between the lock member and the first groove, and the second follower is not in contact with the lock member when the second groove faces the lock member with the second gap between the lock member and the second groove;
      in a third state of the first body and the second body, the first body and the second body are flipped with each other, the second protrusion abuts against the lock member, the lock member interacts with the second follower to fix the second rotation shaft, the first rotation shaft is not fixed by the lock member; and
      in response to the first body and the second body switching from the first state to the third state, an angle between the first body and the second body is larger than 90 degrees and less than 180 degrees, the first body is perpendicular to a connection line between a shaft center of the first rotation shaft and a shaft center of the second rotation shaft, and a minimum angle between the second body and the connection line between the shaft center of the first rotation shaft and the shaft center of the second rotation shaft is greater than 0 and less than 90 degrees.

2. The rotation shaft assembly according to claim 1, wherein:
   the first follower further includes a first arc segment between the first protrusion and the first groove, the first arc segment being configured to cooperate with the lock member to drive the lock member to move toward the first rotation shaft during rotation of the first rotation shaft; and
   the second follower further includes a second arc segment between the second protrusion and the second groove, the second arc being configured to cooperate with the lock member to drive the lock member to move toward the second rotation shaft during rotation of the second rotation shaft.

3. The rotation shaft assembly according to claim 1, wherein:
  a first helical groove and a second helical groove are formed at a first transmission section of the first rotation shaft and a second transmission section of the second rotation shaft, respectively, the first transmission section and the second transmission section being configured to cooperate with the synchronization mechanism;
  the first helical groove and the second helical groove are correspondingly arranged and helical directions of the first helical groove and the second helical groove are opposite to each other;
  a first end of the synchronization mechanism is embedded in the first helical groove, and a second end of the synchronization mechanism is embedded in the second helical groove;
  synchronous rotation of the first rotation shaft and the second rotation shaft after the releasing of action of the lock member on the first follower and the second is realized through movement of the first end along the first helical groove and movement of the second end along the second helical groove move.

4. The rotation shaft assembly according to claim 3, wherein:
  a first annular groove and a second annular groove are formed at the first transmission section and the second transmission section, respectively, to cooperate with the synchronization mechanism;
  the first annular groove is connected to the first helical groove and the second annular groove is connected to the second helical groove; and
  when the second rotation shaft is fixed and the first rotation shaft rotates, the first end of the synchronization mechanism moves along the first annular groove, and when the first rotation shaft is fixed and the second rotation shaft rotates, the second end of the synchronization mechanism moves along the second annular groove.

5. The rotation shaft assembly according to claim 4, further comprising:
  a first shaft sleeve sleeved at the first transmission section; and
  a second shaft sleeve sleeved at the second transmission section;
  wherein the first helical groove and the first annular groove are opened at an outer circumference of the first shaft sleeve, and the second helical groove and the second annular groove are opened at an outer circumference of the second shaft sleeve.

6. The rotation shaft assembly according to claim 1, further comprising:
  a connection member sleeved at the first rotation shaft and the second rotation shaft;
  wherein:
    the synchronization mechanism and the lock member are coaxially connected; and
    the connection member is disposed at least between the synchronization mechanism and the lock member.

7. The rotation shaft assembly according to claim 1, further comprising:
  a first fixation frame configured to connect one end of the first rotation shaft to the first body; and
  a second fixation frame configured to connect one end of the second rotation shaft to the second body.

8. The rotation shaft assembly according to claim 1, wherein:
  the lock member includes an elastic member.

9. An electronic device comprising:
  a first body;
  a second body; and
  a rotation shaft assembly including:
    a first rotation shaft connected to the first body;
    a second rotation shaft connected to the second body;
    a synchronization mechanism, disposed between and connected to the first rotation shaft and the second rotation shaft; and
    a control mechanism, including a first follower sleeved at the first rotation shaft, a second follower sleeved at the second rotation shaft, and a lock member disposed between the first rotation shaft and the second rotation shaft, a first protrusion and a first groove that cooperate with the lock member being provided at the first follower, and a second protrusion and a second groove that cooperate with the lock member being provided at the second follower;
  wherein:
    in a first state of the first body and the second body, the first body and the second body are flipped with each other, the first protrusion abuts against the lock member, the lock member interacts with the first follower to fix the first rotation shaft, and the second rotation shaft is not fixed by the lock member;
    in a second state of the first body and the second body, the first body and the second body are flipped with each other, the first groove and the second groove face the lock member, with a first gap between the lock member and the first groove, and a second gap between the lock member and the second groove, and action of the lock member on the first follower and the second follower is released, and the first rotation shaft and the second rotation shaft rotate synchronously through the synchronization mechanism;
    the first follower is not in contact with the lock member when the first groove faces the lock member with the first gap between the lock member and the first groove, and the second follower is not in contact with the lock member when the second groove faces the lock member with the second gap between the lock member and the second groove;
    in a third state of the first body and the second body, the first body and the second body are flipped with each other, the second protrusion abuts against the lock member, the lock member interacts with the second follower to fix the second rotation shaft, the first rotation shaft is not fixed by the lock member; and
    in response to the first body and the second body switching from the first state to the third state, an angle between the first body and the second body is larger than 90 degrees and less than 180 degrees, the first body is perpendicular to a connection line between a shaft center of the first rotation shaft and a shaft center of the second rotation shaft, and a minimum angle between the second body and the connection line between the shaft center of the first rotation shaft and the shaft center of the second rotation shaft is greater than 0 and less than 90 degrees.

10. The electronic device according to claim 9, wherein:
  the first follower further includes a first arc segment between the first protrusion and the first groove, the first arc segment being configured to cooperate with the lock member to drive the lock member to move toward the first rotation shaft during rotation of the first rotation shaft; and the second follower further includes a second arc segment between the second protrusion and the second groove, the second arc being configured to cooperate with the lock member to drive the lock member to move toward the second rotation shaft during rotation of the second rotation shaft.

11. The electronic device according to claim 9, wherein:

a first helical groove and a second helical groove are formed at a first transmission section of the first rotation shaft and a second transmission section of the second rotation shaft, respectively, the first transmission section and the second transmission section being configured to cooperate with the synchronization mechanism;

the first helical groove and the second helical groove are correspondingly arranged and helical directions of the first helical groove and the second helical groove are opposite to each other;

a first end of the synchronization mechanism is embedded in the first helical groove, and a second end of the synchronization mechanism is embedded in the second helical groove;

synchronous rotation of the first rotation shaft and the second rotation shaft after the releasing of action of the lock member on the first follower and the second is realized through movement of the first end along the first helical groove and movement of the second end along the second helical groove move.

12. The electronic device according to claim 11, wherein:

a first annular groove and a second annular groove are formed at the first transmission section and the second transmission section, respectively, to cooperate with the synchronization mechanism;

the first annular groove is connected to the first helical groove and the second annular groove is connected to the second helical groove; and when the second rotation shaft is fixed and the first rotation shaft rotates, the first end of the synchronization mechanism moves along the first annular groove, and when the first rotation shaft is fixed and the second rotation shaft rotates, the second end of the synchronization mechanism moves along the second annular groove.

13. The electronic device according to claim 12, wherein the rotation shaft assembly further includes:

a first shaft sleeve sleeved at the first transmission section; and a second shaft sleeve sleeved at the second transmission section;

wherein the first helical groove and the first annular groove are opened at an outer circumference of the first shaft sleeve, and the second helical groove and the second annular groove are opened at an outer circumference of the second shaft sleeve.

14. The electronic device according to claim 9, wherein:

the synchronization mechanism and the lock member are coaxially connected; and the rotation shaft assembly further includes a connection member sleeved at the first rotation shaft and the second rotation shaft and disposed at least between the synchronization mechanism and the lock member.

15. The electronic device according to claim 9, wherein the rotation shaft assembly further includes:

a first fixation frame connecting one end of the first rotation shaft to the first body; and a second fixation frame connecting one end of the second rotation shaft to the second body.

16. The electronic device according to claim 9, wherein: the lock member includes an elastic member.

* * * * *